United States Patent [19]

Call

[11] 4,351,407
[45] Sep. 28, 1982

[54] AXLE DRIVE ASSEMBLY

[75] Inventor: Enos P. Call, Columbia City, Ind.

[73] Assignee: Dana Corporation, Toledo, Ohio

[21] Appl. No.: 106,138

[22] Filed: Dec. 21, 1979

[51] Int. Cl.³ .................. B60B 37/00; F16J 15/10
[52] U.S. Cl. .................................. 180/75; 29/512;
          180/88; 301/1; 403/261; 403/359
[58] Field of Search ................ 180/75, 88; 301/1;
          29/509, 512; 403/359, 261, 315, 274

[56] References Cited

U.S. PATENT DOCUMENTS

| | | | |
|---|---|---|---|
| 1,451,267 | 4/1923 | Masury | 301/1 |
| 2,038,554 | 4/1936 | Edgar | 403/359 |
| 2,052,524 | 8/1936 | Baker | 301/1 |
| 2,364,109 | 12/1944 | Taylor | 29/512 |
| 2,532,605 | 12/1950 | Castleberry | 301/1 |
| 2,539,387 | 1/1951 | Alden | 301/126 |
| 2,768,698 | 10/1956 | Fabian | 74/801 |
| 3,336,998 | 8/1967 | Avrea | 180/88 |

Primary Examiner—Joseph F. Peters, Jr.
Assistant Examiner—Donn McGiehan
Attorney, Agent, or Firm—Frank B. McDonald

[57] ABSTRACT

A full-floating axle drive assembly for propelling a vehicle includes a shaft having a splined end to which a splined drive member is axially and non-rotatably secured. The drive member is secured to the splined end of the shaft between the bottom of the shaft splines and a forged flange end. In a preferred embodiment, the shaft extends through an axle tube on which a wheel hub is fully supported by bearings. The drive member is secured to the wheel hub which is rotated thereby about the axle tube.

2 Claims, 1 Drawing Figure

U.S. Patent  Sep. 28, 1982  4,351,407
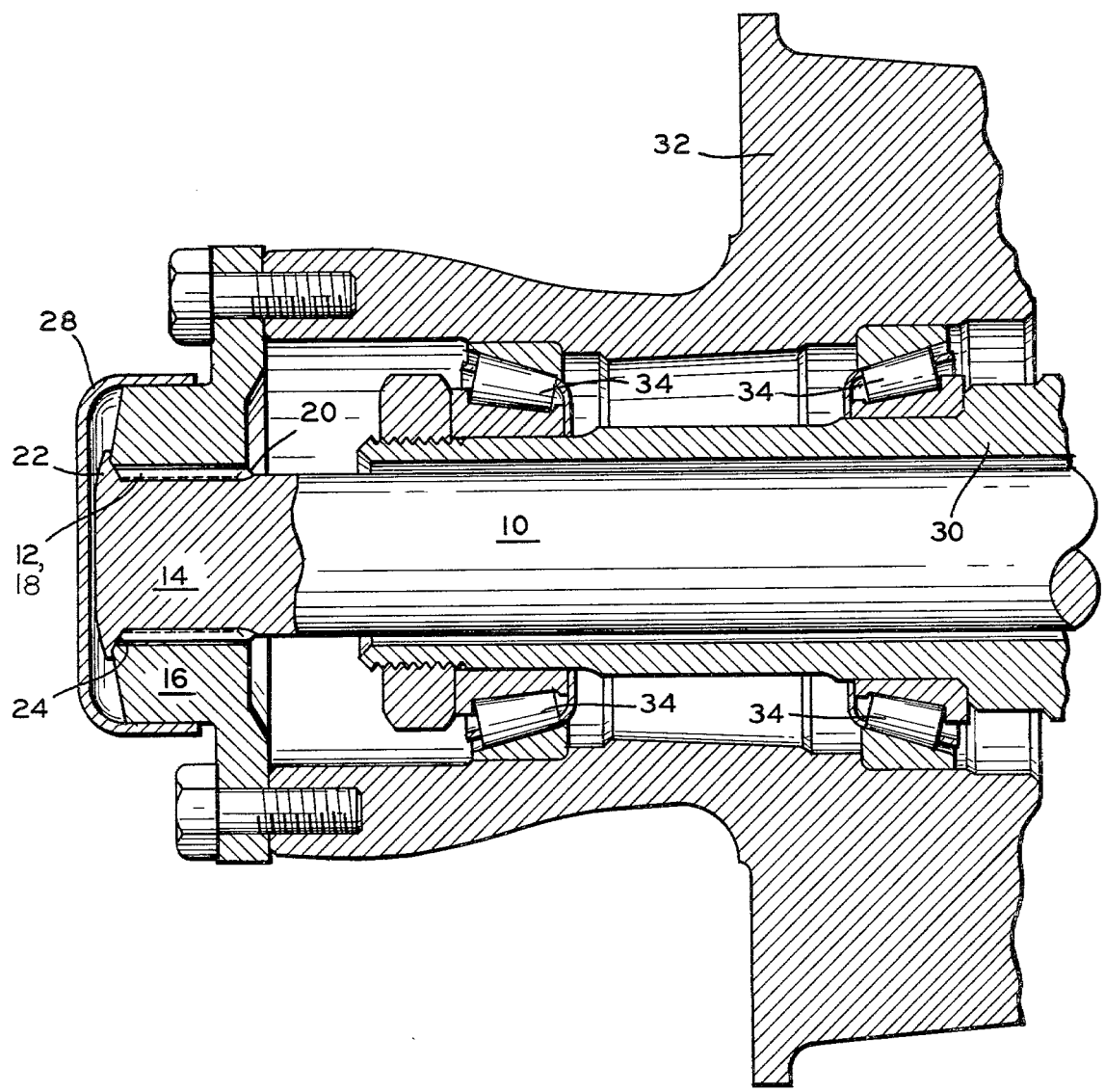

AXLE DRIVE ASSEMBLY

BACKGROUND

This invention relates to vehicular drive assemblies, and particularly to fully floating drive axles. Prior construction of axles in the light to medium truck category has involved the forging of a one-piece axle and axle shaft flange, and has necessitated flange machining to rather close tolerances to provide the finished drive axle. The production of various shaft lengths has been relatively cumbersome and expensive, since production line changes involving resetting of equipment has been required. Even where such axles have been of two-piece construction, viz. axle shaft flanges splined to axle shafts, as for example in certain off-highway construction and industrial equipment, the flanges have in general been axially secured to the shafts by snap rings, or simply left unsecured. When left unsecured the axles have been subject to chucking under load changes and/or to end thrust damage which occurs upon the cornering of the vehicle as result of relative axial movement of the shaft within the axle flange.

SUMMARY OF INVENTION

The drive assembly of this invention contains a drive axle shaft having a splined portion at one end, over which a splined drive member is axially and non-rotatably secured between (1) an inner extremity of the splined portion and (2) a forged flange formed at the end of the axle shaft. The axle shaft end is not subject to chucking or end thrust, as the axle shaft does not move axially relative to the drive flange. Moreover, the axle avoids such relative movement without the use of snap rings and the attendant need for additional machining and parts.

DESCRIPTION OF THE DRAWING

The drawing is a side view in cross-section of a preferred embodiment of the drive assembly of this invention.

DETAILED DESCRIPTION

Referring to the drawing, a full-floating drive assembly is shown having a hardened steel axle shaft 10 containing splines 12 on its end portion 14. A drive member embodied as an axle shaft flange 16 contains splines 18 which mate with splines 12. The axle shaft flange 16 is axially and non-rotatably secured to the splined end portion 14 of shaft 10 between the inner extremity 20 of the splines 12 and a forged flange 22 formed on the end of shaft 10, and which defines the outer extremity 24 of the splines 12. An end cap 28 fixed to the drive member 16 provides protection against escape and/or contamination of lubricant in the splined connection, and prevents moisture intrusion relative thereto.

The preferred embodiment of the present invention is incorporated in a full-floating drive shaft assembly, as shown, wherein the drive axle shaft 10 extends through an axle tube 30 on which a wheel hub 32 is rotatably supported on bearings 34 mounted on the latter tube. The axle shaft flange 16 is rigidly connected to the wheel hub 32 for rotation of the hub on the bearing 34 about the axle tube 30. A preferable feature of this invention is the inclusion of a slight helix in either the shaft or axle splines for insuring a good interference fit between the shaft 10 and axle flange 16.

The preferred embodiment of this invention employs powdered metallurgy in the manufacture of the axle shaft flange 16, which further reduces machining requirements in the making of the axle drive assembly. Thus, a powdered metal alloy is compressed in a heated die to form a finished splined axle flange, and hence machining of the internal splines of the flange is avoided. A preferred alloy for use in such construction is identified as a powdered metal nickel-steel, more specifically as FN-0208-5, a Metal Powder Industries Federation designation having a composition in accordance with the following standard: (1) Iron (Fe) 91.9 to 98.7 percent by weight, (2) Nickel (Ni) 1.0 to 3.0 percent by weight, (3) Carbon (C) 0.3 to 0.6 percent by weight, and (4) Copper (Cu) 0 to 2.5 percent by weight.

The preferred method of installing the drive flange 16 on the drive axle of this invention is performed as follows. The powdered flange 16 is inserted on the shaft end 14 until it bottoms against the inner extremity 20 of the splines 12. The shaft end is then forged to form a shaft end flange 22 which locks the flange 16 between the inner extremity 20 and the shaft end flange 22. The forging process is preferably accomplished in an orbital rotary movement, to provide for a uniform work hardening of the shaft end.

What is claimed is:

1. In a drive assembly comprising an axle tube, a hub rotatably supported on said tube, a drive axle shaft extending through said tube, said axle shaft including external splines at one end thereof, said splines having inner and outer extremities, said assembly further comprising a drive flange having mating internal splines mounted over said external splines of said axle shaft, said drive flange being affixed to said hub for driving rotation thereof; an improvement comprising said drive flange being axially and non-rotatably secured to said axle shaft via the combination of
   (a) a forged flange formed at said outer extremity of said splines of said axle shaft whereby said drive flange is urged against said inner extremity of said splines of said axle shaft, and
   (b) a helix in at least one of said mating splines whereby an interference fit is achieved between said shaft and drive flange.

2. The drive assembly of claim 1 wherein said drive flange comprises a powdered metal alloy consisting essentially of (1) Iron (Fe) 91.9 to 98.7 percent by weight, (2) Nickel (Ni) 1.0 to 3.0 percent by weight, (3) Carbon (C) 0.3 to 0.6 percent by weight, and (4) Copper (Cu) 0 to 2.5 percent by weight.

* * * * *